United States Patent [19]

Matsuzaki

[11] Patent Number: 5,200,869
[45] Date of Patent: Apr. 6, 1993

[54] FLYING TYPE THIN FILM MAGNETIC HEAD HAVING A TRANSDUCING ELEMENT

[75] Inventor: Mikio Matsuzaki, Tokyo, Japan

[73] Assignee: TDK Corporation, Tokyo, Japan

[21] Appl. No.: 658,872

[22] Filed: Feb. 22, 1991

[30] Foreign Application Priority Data

Feb. 22, 1990 [JP] Japan .................. 2-43572

[51] Int. Cl.⁵ .............................................. G11B 5/60
[52] U.S. Cl. .................................................. 360/103
[58] Field of Search ...................................... 360/103

[56] References Cited

U.S. PATENT DOCUMENTS

| | | |
|---|---|---|
| 4,789,914 | 12/1988 | Ainslie .................. 360/103 |
| 4,797,765 | 1/1989 | Ezaki et al. . |
| 4,992,897 | 2/1991 | Deroux-Dauphin .......... 360/103 |
| 5,001,583 | 3/1991 | Matsuzaki . |
| 5,006,946 | 4/1991 | Matsuzaki . |
| 5,068,759 | 11/1991 | Matsuzaki . |
| 5,097,369 | 3/1992 | Matsuzaki . |
| 5,124,864 | 1/1992 | Matsuzaki . |
| 5,126,903 | 1/1992 | Matsuzaki . |
| 5,134,531 | 7/1992 | Matsuzaki et al. . |

*Primary Examiner*—A. J. Heinz
*Attorney, Agent, or Firm*—Oblon, Spivak, McClelland, Maier & Neustadt

[57] ABSTRACT

A thin film magnetic head has a slider and a thin film magnetic transducing element attached to an end surface of the slider, wherein the thin film magnetic transducing element is provided with bonding pads electrically connected to a conductor coil, and the bonding pads are extended to the surface opposite the surface of the slider which faces a magnetic recording medium.

4 Claims, 8 Drawing Sheets

FLYING TYPE THIN FILM MAGNETIC HEAD HAVING A TRANSDUCING ELEMENT

BACKGROUND OF THE INVENTION

1. Field of the Invention

The present invention relates to a flying type thin film magnetic head provided with a thin film magnetic transducing element at an end surface of the slider. More particularly, it relates to a flying type thin film magnetic head wherein the bonding pad of the thin film magnetic transducing element is extended to the surface of the slider which opposes a magnetic medium.

2. Discussion of Background

There has been known, for a magnetic disk drive, a flying type thin film magnetic head which floats with a space by a minute air bearing to a magnetic recording medium by utilizing a dynamic pressure resulted when the magnetic recording medium is moved. Such a flying type thin film magnetic head is disclosed in U.S. Pat. Nos. 4,130,847, 4,218,715 and 4,219,853. Namely, the basic construction of the conventional magnetic head is such that two rail portions are formed with a space therebetween at the surface of the slider made of ceramics which opposes the magnetic recording medium so that the surface between the rail portions functions as an air bearing surface, and a tapered portion is formed at each one end (at the air intake side) of the rail portions so that a lifting force is produced at the tapered portions in association with the magnetic recording medium. The thin film magnetic transducing element is prepared in accordance with the same process as an IC manufacturing technology, and is formed or attached at the air discharging side which opposes the tapered portions of the slider.

In the thin film magnetic head of this kind, there is a trend of miniaturization in order to comply with a demand of high density and high speed magnetic recording. The miniaturization of the thin film magnetic head is effective to reduce a flying height necessary for the high density recording and to reduce a spacing loss. Further, it is advantageous to increase the resonance frequency in association with a gimbal device, to eliminate crushing and to improve durability. In addition, an appropriate balance is obtainable between the dynamic pressure and the pressure of a supporting spring and the posture of the magnetic head can be properly maintained, whereby a stable flying characteristic can be obtained. Further, reduction in the mass of the magnetic head obtained by the miniaturization increases the speed of accessing movement of an arm for supporting the gimbal device.

It is, however, difficult to reduce the size of the conventional flying type thin film magnetic head because it has a complicated structure such that the rail portions and the tapered portions are provided at the surface of the slider opposing the magnetic recording medium. To solve this problem, there has been proposed a thin film magnetic head wherein the surface of the slider opposing the magnetic recording medium is made flat without forming the rail portions (e.g. in U.S. Pat. No. 4,803,577). FIG. 12 is a perspective view of such thin film magnetic head of the above-mentioned type. In FIG. 12, a reference numeral 1 designates a slider, a numeral 2 designates a thin film magnetic transducing element and numerals 3, 4 designate bonding pads. The slider 1 has a medium-opposing surface 101 which is made flat without forming rail portions and tapered surfaces and the opposing surface 101 which functions, as a whole, as an air bearing surface.

The thin film magnetic transducing element 2 is attached to an end surface of the slider 1 which is an end in the direction of air discharging in combination with the magnetic recording medium. The element 2 used is a single which is disposed around an intermediate portion in the width direction of the slider 1.

The bonding pads 3, 4 are connected to both ends of a conductor coil film which constitutes the thin film magnetic transducing element 2.

In a case that the magnetic head is used in a magnetic disk drive, it is driven by a so-called contact.start.stop method wherein the surface 102 opposite the medium-opposing surface 101 is attached to a gimbal type magnetic head supporting device (not shown) while the medium-opposing surface 101 is brought into spring-contact with the surface of the magnetic disk, and starting and stopping are carried out in this state. When the magnetic disk is in a stationary state, the medium-opposing surface 101 is pushed to the surface of the magnetic disk by the spring action of the magnetic head supporting device. However, when the magnetic disk is rotated, a dynamic pressure for floating the slider 1 to the medium-opposing surface 101 is produced, whereby a flying height obtained by balancing the dynamic pressure and the spring pressure of the magnetic head supporting device is provided.

Since the thin film magnetic head as shown in FIG. 12 is provided with the medium-opposing surface 101 in the slider 1 which is simply flat without rail portions, it is possible to reduce the size of the magnetic head to thereby assure the above-mentioned advantage.

However, the above-mentioned thin film magnetic head has the following problems.

(A) Since the thin film magnetic transducing element 2 and the bonding pads 3, 4 are positioned on the same end surface 103, the surface area of the end surface 103 is limited because of the surface area required for positioning the thin film magnetic transducing element 2 and the bonding pads 3, 4, and accordingly, there is a limitation for miniaturizing the thin film magnetic head.

(B) In a thin film magnetic head of this kind, generally, a head supporting device is attached to the surface 102 which is opposite the medium-opposing surface. Lead wires for a reading/writing circuit which are electrically connected to the bonding pads 3, 4 of the thin film magnetic head 2 are supported and guided by the head supporting device. When the lead wires are to be connected to the bonding pads 3, 4, it is necessary to bend the lead wires from the surface 102 to the surface 103 and to connect them to the conductor coil. The connecting operation is troublesome. Further, an excessive external force is produced due to the spring action of the lead wires, which gives bad influence on the floating characteristic of the thin film magnetic head.

(C) The both side end portions in the width direction of the medium-opposing surface 101 project while the intermediate portion recesses due to the deformation of a workpiece during machining operations in order to produce the slider, as illustrated in FIG. 13 with a great exaggeration. When such projections and the recess are produced in the medium-opposing surface 101, a proper contact of the magnetic head to the magnetic disk can not be obtained, whereby good head touch can not be obtained; a spacing loss becomes large and head-crushing may be caused. The durability of the magnetic head is also reduced.

SUMMARY OF THE INVENTION

It is an object of the present invention to provide a thin film magnetic head capable of reducing the size without suffering restriction by a surface area for bonding pads; permitting easy connection of the lead wires to the conductor coil; providing good head touching; of minimizing a spacing loss; providing head crushing from occurring; providing excellent durability, and facilitating the position determination of the head supporting device.

The foregoing and other objects of the present invention have been attained by providing a thin film magnetic head which comprises a slider and a thin film magnetic transducing element attached to an end surface of the slider, wherein the thin film magnetic transducing element is provided with a bonding pad electrically connected to a conductor coil, and the bonding pad is extended to the surface opposite the surface of the slider which faces a magnetic recording medium.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF PREFERRED EMBODIMENT

Figure 1:
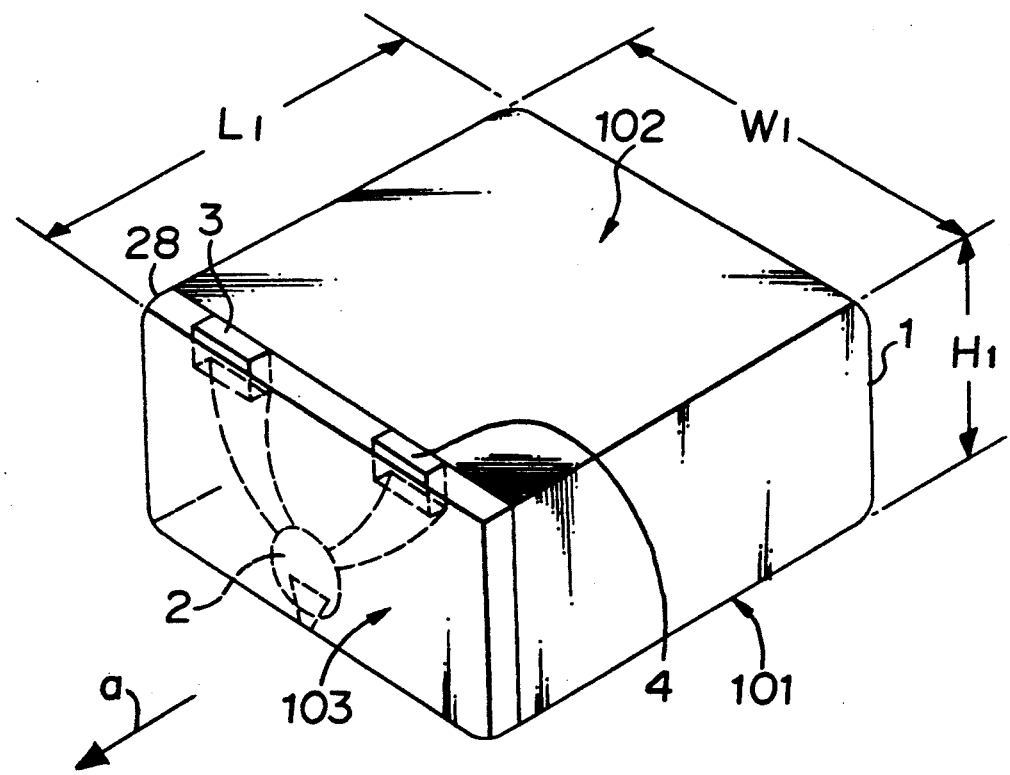
FIG. 1 is a perspective view of an embodiment of the thin film magnetic head according to the present invention.

Referring to the drawings, wherein the same reference numerals designate the same or corresponding parts throughout the several views, and more particularly to FIG. 1 thereof, there is shown in perspective view an embodiment of the thin film magnetic head according to the present invention. In FIG. 1, the bonding pads 3, 4 for the thin film magnetic transducing element 2 are exposed at the surface 102 of the slider 1 which is opposite the medium-opposing surface 101. The bonding pads 3, 4 are respectively formed as plated layers so that the surface area of each of them which exposes at the surface 102 is sufficient for connecting lead wires. The medium-opposing surface 101 is flat in which no rail portions and no tapered portions are formed.

It is preferable to form edges A and B of the medium-opposing surface 101, when they are viewed from the air discharging direction a, to have an arched shape so that undesirable dragging to the surface of a magnetic disk at the time of contact-starting can be eliminated. The other edges C and/or D may be arch-shaped.

The thin film magnetic transducing element 2 is attached to the end surface 103 which is at the air-discharging side with respect to an air flow direction a, in the combination of a magnetic recording medium.

In this specific embodiment, a single of the thin film magnetic transducing element 2 is disposed around an intermediate portion in the width direction of the slider 1. However, the transducing element 2 may be disposed deflected to either side.

In the case that the bonding pads 3, 4 of the thin film magnetic transducing element 2 are formed at the surface 102 which is opposite the medium-opposing surface 101, the surface area of the end surface 103 to which the thin film magnetic transducing element 2 is attached can be made small unlike the conventional technique that the bonding pads 3, 4 are provided on the surface 103 where the thin film magnetic transducing element 2 is attached, whereby the entire size of the thin film magnetic head can be reduced. Specifically, the size of the slider 1 can be easily reduced in such a manner that the thickness $H_1$ from the medium-opposing surface 101 to the opposite surface 102 is 0.65 mm or less, the length $L_1$ of the slider 1 in the air-discharging direction is in a range of 0.5 mm–2 mm, and the width $W_1$ in the direction perpendicular to the air-flowing direction is about 0.5 mm–2 mm.

Since the surface 102 on which the bonding pads 3, 4 are formed generally coincides with the fitting surface for the magnetic head supporting device, bonding operation of the lead wires to the bonding pads 3, 4 can be easy. Further, in bonding the lead wires to the bonding pads 3, 4, an external force which may be exerted to the thin film magnetic head by bending the lead wires can be greatly reduced because the bending operation is unnecessary.

The thin film magnetic transducing element 2 is a thin film magnetic head element prepared in accordance with the same process as an IC manufacturing technology.

Figure 2:
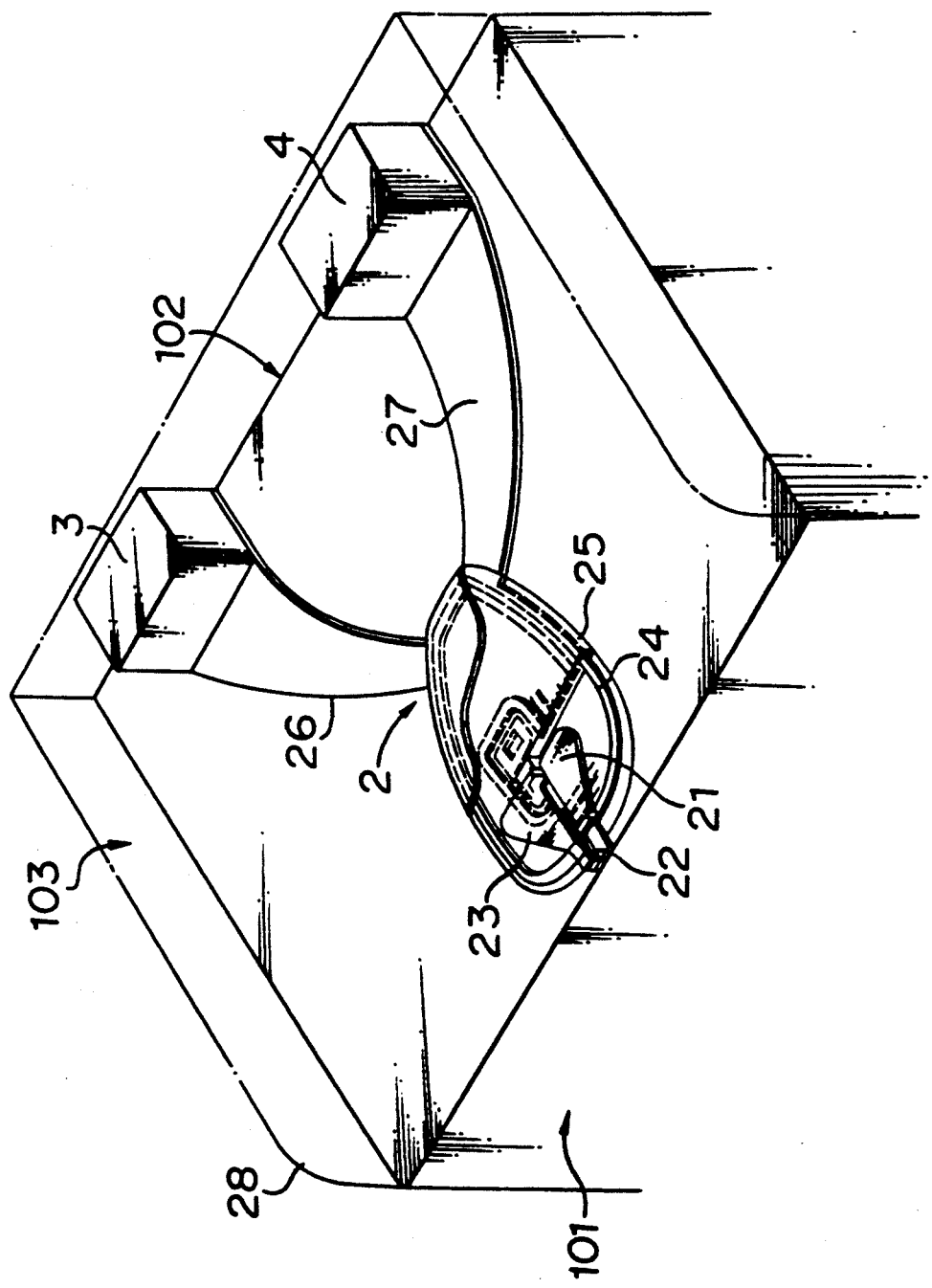
FIG. 2 is a perspective view partly omitted of an embodiment of the thin film magnetic head in which an arrangement of a thin film magnetic transducing element and bonding pads is illustrated in detail.
Figure 3:
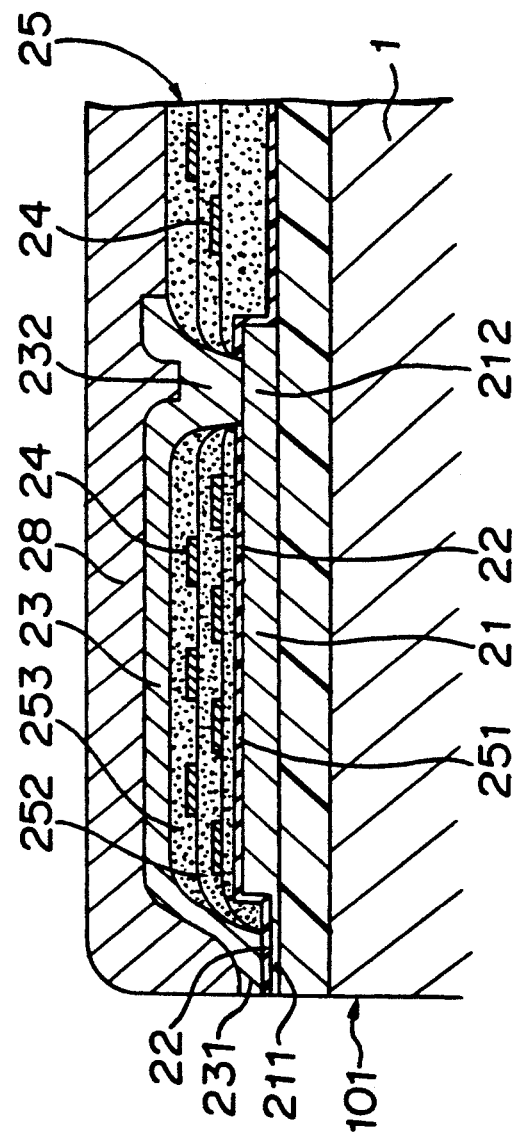
FIG. 3 is an enlarged longitudinal cross-sectional view of the thin film magnetic transducing element.

FIG. 2 is an enlarged perspective view partly omitted of an embodiment of the thin film magnetic transducing element 2, and FIG. 3 is an enlarged longitudinal cross-sectional view partly omitted of the element 2. In FIGS. 2 and 3, a reference numeral 21 designates a lower magnetic film, a numeral 22 designates a gap film made of a material such as alumina, a numeral 23 designates an upper magnetic film, numerals 24 designate conductor coil films, a numeral 25 designates an insulating film made of an organic resinous material such as novolak resin, numerals 26 and 27 designate lead electrodes, and a numeral 28 designates a protective film.

End portions of the lower and upper magnetic films 21, 23 constitute pole sections 211, 231 which oppose interposing the gap film 22 having a small thickness so that the pole sections perform reading and writing function. Numerals 212, 232 designate yoke portions which are connected to each other at the back gap which is opposite the pole sections 211, 231.

The insulating film 25 is constituted by a plurality of layers of insulating films 251-253. The conductor coil films 24 are formed on the insulating films 251, 252 so that the conductor coil films 24 surround around the connecting portion of the yoke portions 212, 232 in a spiral form.

The lead electrodes 26, 27 have their ends connected to both ends of the conductor coil films 24 and other ends connected to the bonding pads 3, 4.

Figure 4:
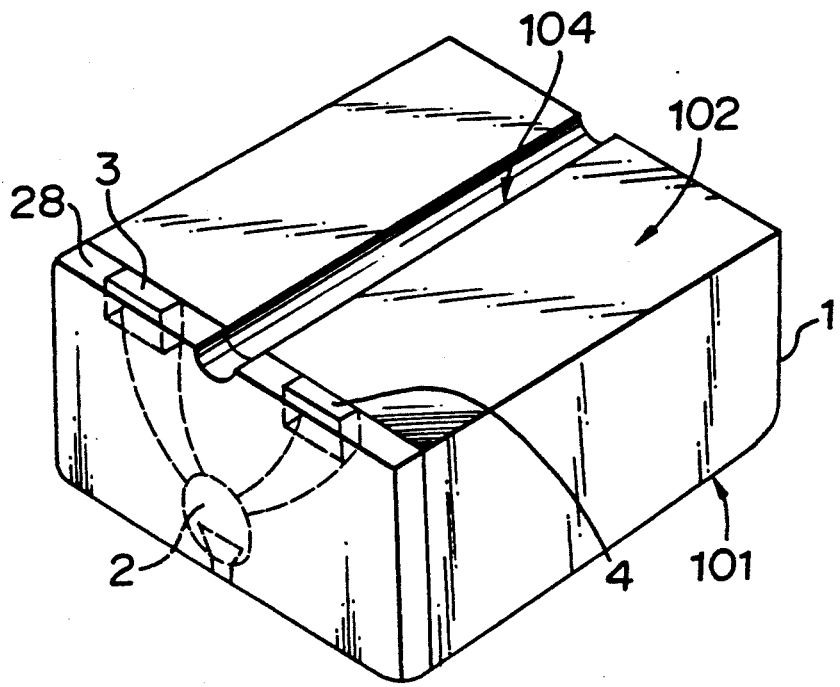
FIGS. 4 and 5 are respectively perspective views of other embodiments of the thin film magnetic head according to the present invention.

FIG. 4 is a perspective view of another embodiment of the thin film magnetic head according to the present invention. In FIG. 4, the slider 1 has a linear groove 104 in the surface 102, which is opposite the medium-opposing surface 101, at an intermediate portion in the width direction of the slider 1 so as to extend in its longitudinal direction. The groove 104 may be in a semi-circular form or a rectangular form in cross section and is extended in the entire length of the slider 1. The direction of extension of the groove 104 is preferably in the direction of air flow. However, the direction may not always be such direction in order to obtain a desired effect.

By forming the groove 104, the medium-opposing surface 101 of the slider 1 has the convex-shaped curved surface wherein the level of the medium-opposing surface 101 is the highest at the intermediate portion in the width direction where the thin film magnetic transducing element 2 is located, and the level gradually decreases toward both side ends. Accordingly, irregularity in the medium-opposing surface 101 of the slider which may result from distortion due to a machining work can be corrected, and a thin film magnetic head providing good head touch, reducing the spacing loss, minimizing head crushing and having high durability can be obtained.

Further, the groove can be used for positioning the magnetic head supporting device. Accordingly, the thin film magnetic head can be easily fitted to the magnetic head supporting device even when the head is miniaturized.

Figure 5:
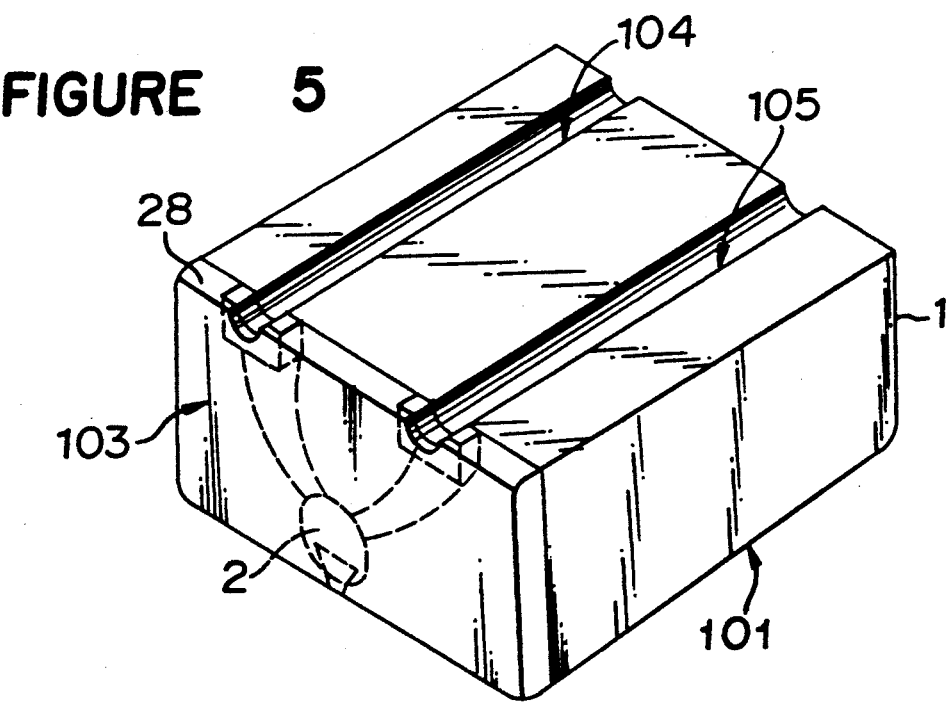

FIG. 5 shows another embodiment of the thin film magnetic head according to the present invention. In this embodiment, linear grooves 104, 105 are formed in the surface 102 opposite the medium-opposing surface 101 of the slider 1 at the positions corresponding to the bonding pads 3, 4 respectively and in the direction of the length of the slider 1. The same function and effect as the embodiment shown in FIG. 4 can be obtained in this embodiment.

Figure 6:
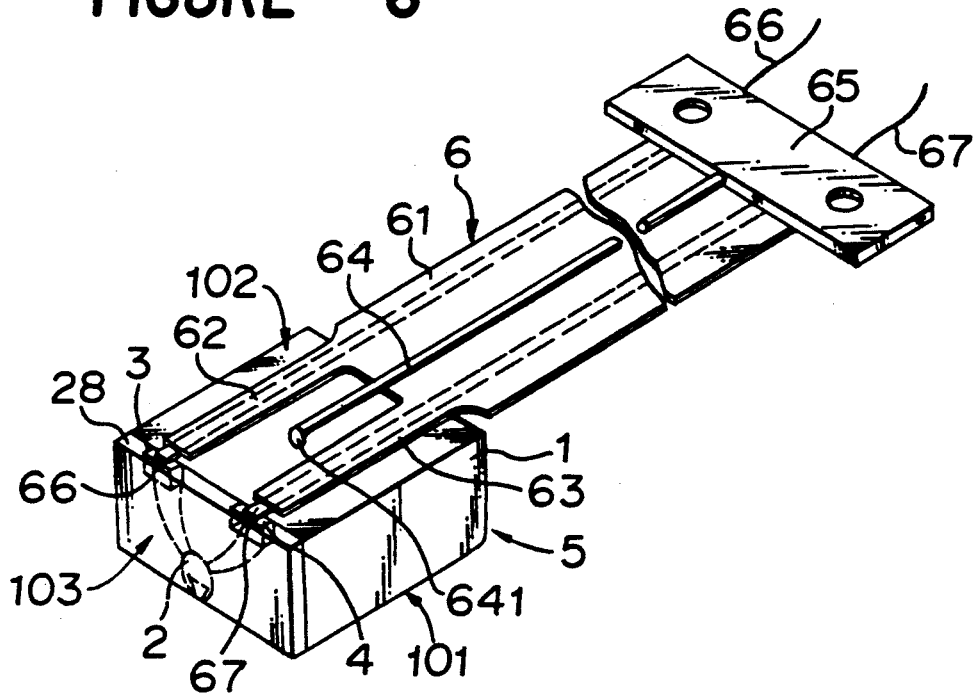
FIG. 6 is a perspective view of an embodiment of the magnetic head supporting device on which a thin film magnetic head according to the present invention is held.
Figure 7:
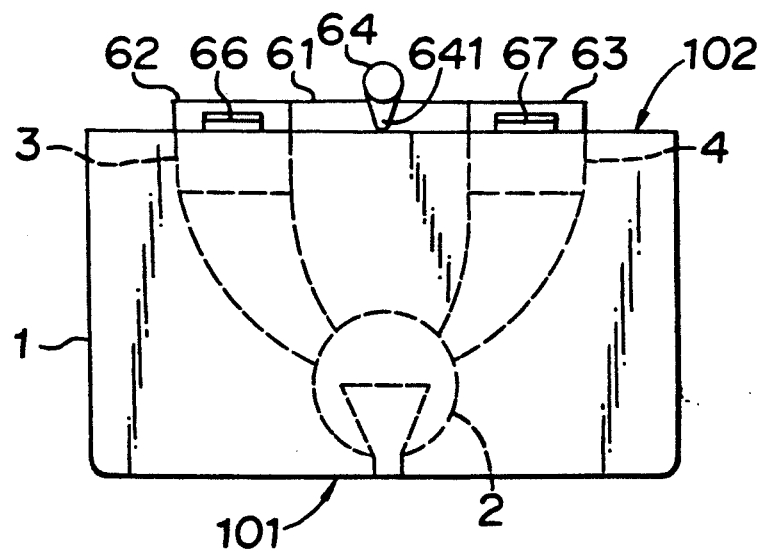
FIG. 7 is an elevation view of the magnetic head supporting device and the thin film magnetic head as in FIG. 6.

FIG. 6 is a perspective view of an embodiment of a magnetic head supporting device on which the thin film magnetic head shown in FIG. 1 is mounted, and FIG. 7 is an elevation view of the magnetic head supporting device and the thin film magnetic head. In FIGS. 6 and 7, the magnetic head supporting device 6 holding the thin film magnetic head 5 includes a flexible member 61, head supporting arms 62, 63, a magnetic head pressing arm 64 and a fitting piece 65.

The flexible member 61 is formed in a plate-like shape by using a polymeric resinous material as an insulating material. Lead wires 66 and 67 which are connected to a reading/writing element provided outside, are embedded in the flexible member 61. As the polymeric material used for the flexible member 61, such a material, e.g. polyimide resin as that having a mechanical strength durable to repeated bending operations and twisting operations and showing an appropriate spring function and elongation is suitable. Thus, by forming the flexible member 61 by a polymeric resinous material, the flexible member 61 shows a weak spring function and a high degree of freedom of twisting and elongation in comparison with the conventional flexible member made of a resilient metallic material such as stainless steel can be obtained. Accordingly, even in a case that the size of the magnetic head is reduced to reduce a flying height in order to obtain high density magnetic recording, there is still obtainable a balance between the dynamic pressure produced at the slider 1 and the spring function of the flexible member 61, and therefore, a stable control of the posture of the magnetic head can be obtained. Further, the flexible member 61 made of a polymeric resinous material allows easy processing.

The magnetic head supporting arms 62, 63 extend in the flexible member 61. Each one end of the lead wires 66, 67 is led outside from each of the magnetic head supporting arms 62, 63.

The fitting piece 65 made of a rigid material such as metal is integrally attached to the other end of the flexible member 61 by means of bonding. The magnetic head pressing arm 64 extends from the fitting piece 65 through the upper surface of the flexible member 61 onto the surface of the magnetic head 5.

In the combination of the magnetic head supporting device 6 and the thin film magnetic head 5, the magnetic head supporting arms 62, 63 are respectively fitted to the surface 102 of the slider 1 by means of bonding, and the lead wires 66, 67 projecting from the end portions of the magnetic head supporting arms 62, 63 are respectively connected to the bonding pads 3, 4 by means of soldering so that the end portion 641 of the magnetic head pressing arm 64 is positioned at the surface 102 of the slider 1. The free end 641 of the magnetic head pressing arm 64 is in spring-contact with the slider 1 so that the thin film magnetic head 7 receives a load from the pressing arm 64 downwardly.

In the embodiment shown in FIG. 6, the bonding operation of the lead wires 66, 67 to the bonding pads 3, 4 can be easily done because it can be carried out on the surface 102 of the slider to which the magnetic head supporting device is fitted. Further, in the bonding of the lead wires 66, 67 to the bonding pads 3, 4, bending operation to the lead wires 66, 67 is unnecessary. Accordingly, an external force applied to the thin film magnetic head 5 by the lead wires 66, 67 can be reduced.

Figure 8:
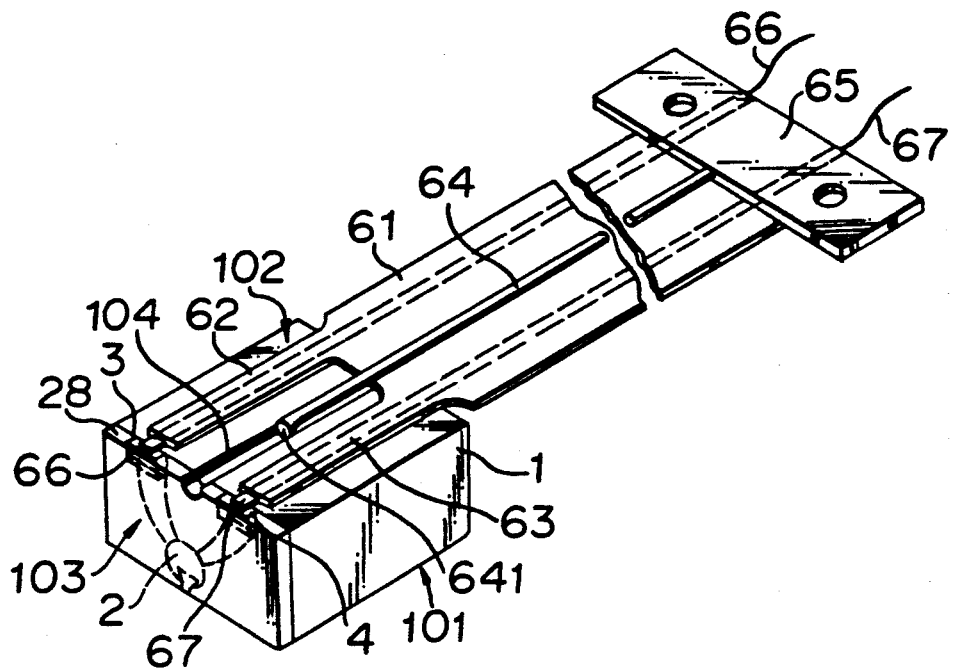
FIG. 8 is a perspective view of another embodiment of the magnetic head supporting device on which a thin film magnetic head according to the present invention is held.
Figure 9:
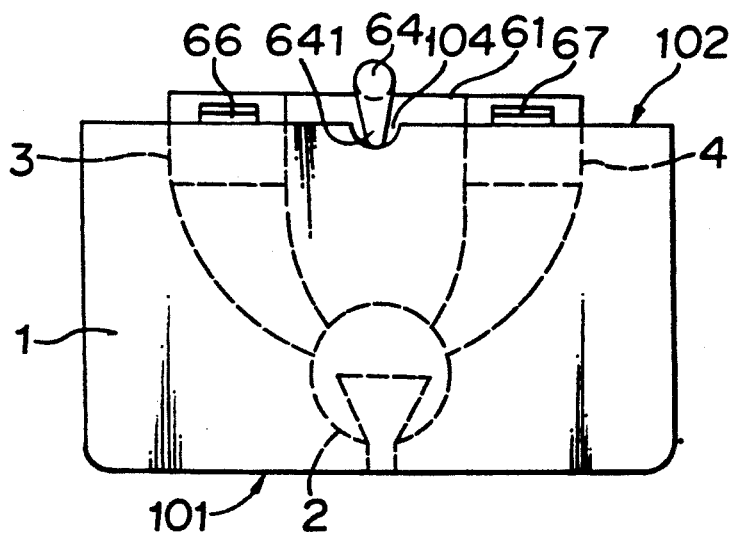
FIG. 9 is an elevation view of the magnetic head supporting device and the thin film magnetic head as in FIG. 8.

FIG. 8 is a perspective view showing another embodiment of the thin film magnetic head 5 as shown in FIG. 4, which is attached to the magnetic head supporting device 6, and FIG. 9 is an elevation view of the thin film magnetic head 5 and the magnetic head supporting device.

The construction of this embodiment is the same as that of the embodiment shown in FIGS. 6 and 7 except that a linear groove 104 is formed in the surface 102 opposite the medium-opposing surface 101 of the slider 1 in its longitudinal direction and the free end portion 641 of the magnetic head pressing arm 64 is fitted into the groove 104 for position determination. This embodiment performs the same function and effect as those of the embodiment shown in FIGS. 6 and 7. In addition, this embodiment allows the position determination of the magnetic head supporting device 6 by utilizing the groove 104, and accordingly, it is advantageous in that the attachment of the magnetic supporting device can be easy even when the size of the slider 1 is reduced.

Figure 10:
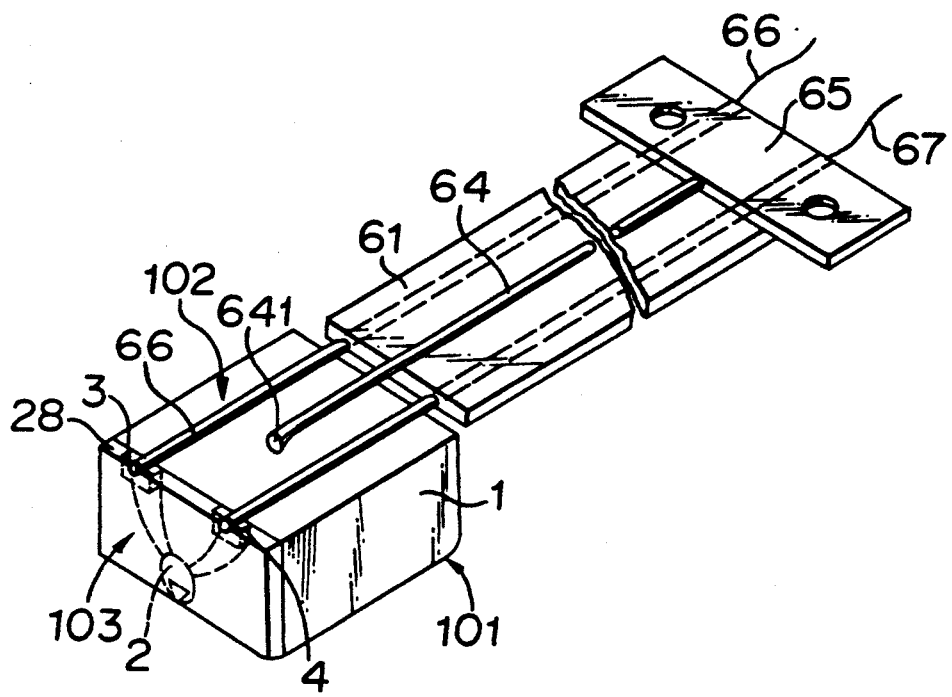
FIG. 10 is a perspective view of another embodiment of the magnetic head supporting device on which a thin film magnetic head according to the present invention is held.
Figure 11:
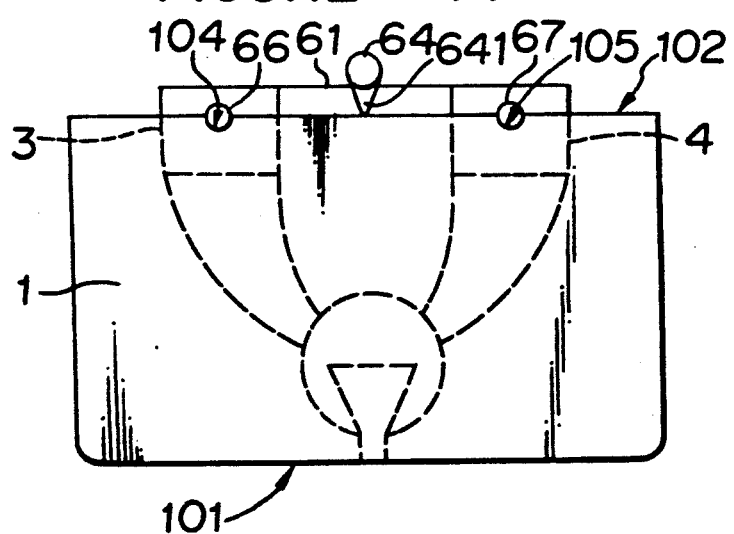
FIG. 11 is an elevation view of the magnetic head supporting device and the thin film magnetic head as in FIG. 10.
Figure 12:
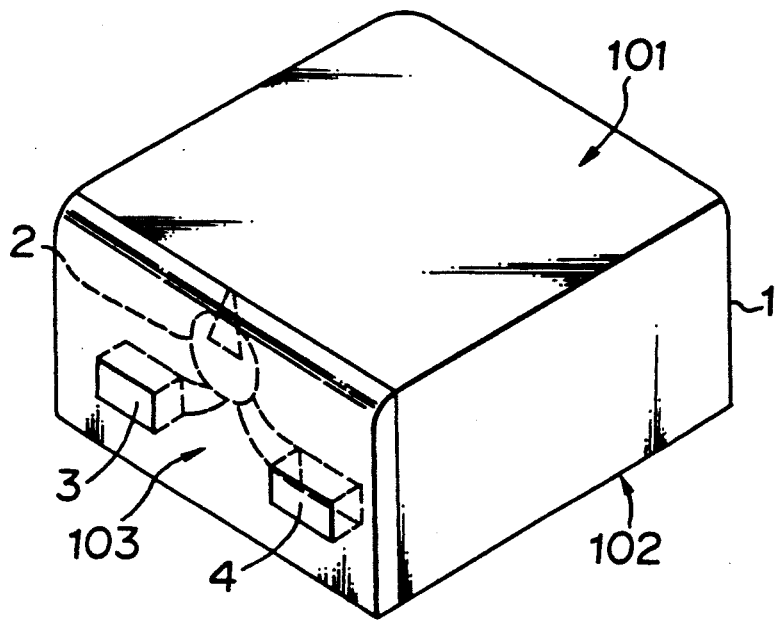
FIG. 12 is a perspective view of a conventional thin film magnetic head.
Figure 13:
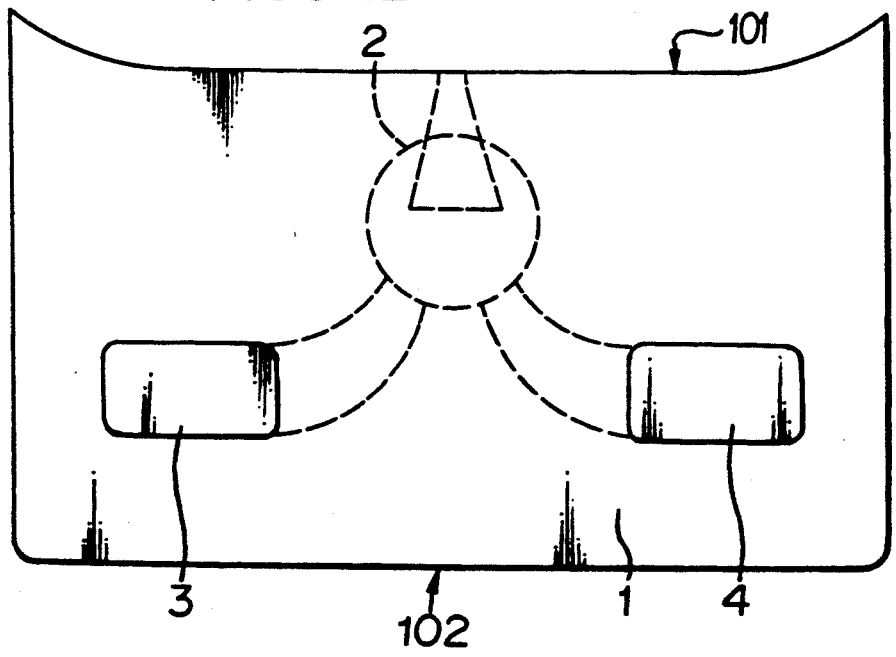
FIG. 13 is a diagram showing a problem in the conventional thin film magnetic head.

FIG. 10 is a perspective view of another embodiment of the thin film magnetic head shown in FIG. 5, which is attached to the magnetic head supporting device, and FIG. 11 is an elevation view of the FIG. 10 embodiment.

In this embodiment, the lead wires 66, 67 extended in parallel to each other from the flexible member 61 are respectively connected and fixed to the grooves 104, 105 of the thin film magnetic head 5 by means of bonding, and each end of the lead wires 66, 67 is electrically connected to each of the bonding pads 3, 4. In this embodiment, the same effect as that of the embodiment shown in FIGS. 8 and 9 is obtainable.

In the above-mentioned embodiments, explanation is made as to use of an in-plane recording and reproducing thin film magnetic head. However, the present invention is applicable to a vertical magnetic recording and reproducing thin film magnetic head. Further, the present invention is applicable not only to a two terminal type thin film magnetic head which is of a type as in the embodiments of the present invention, but also a three terminal type thin film magnetic head having a center tap.

Thus, in accordance with the present invention, the following effects can be obtained.

(a) The bonding pads of the thin film magnetic transducing element are extended to the surface opposite the medium-opposing surface of the slider, whereby it is possible to reduce the size of the thin film magnetic head, without restriction, which is suitable for high density magnetic recording, high response and high accessability.

(b) Bonding operation of the lead wires to the bonding pads can be easily conducted. In the bonding of the lead wires to the bonding pads, it is unnecessary to bend the lead wires, so that an external force exerted by the lead wires is small. Accordingly, a thin film magnetic head having stable electromagnetic transducing and floating characteristics can be provided.

(c) The groove or grooves are formed in the surface opposite the medium-opposing surface of the slider, whereby a convex-shaped curved surface is formed in the medium-opposing surface of the slider. Accordingly, a thin film magnetic head capable of providing good head touching, reducing a space loss, reducing head crushing and increasing durability can be obtained.

(d) The groove or grooves formed in the surface opposite the medium-opposing surface of the slider allows easy attachment of the magnetic head supporting device to the slider even when the size of the slider is reduced.

Obviously, numerous modifications and variations of the present invention are possible in light of the above teachings. It is therefore to be understood that within the scope of the appended claims, the invention may be practiced otherwise than as specifically described herein.

What is claimed is:

1. A thin film magnetic head comprising:
   a slider having a first surface which faces a magnetic recording medium, a second surface opposite to said first surface and an end surface; and
   a thin film magnetic transducing element attached to the end surface of the slider, said thin film magnetic transducing element being provided with a bonding pad electrically connected to a conductor coil, said bonding pad having a first surface which is adjacent to the end surface of the slider and a connecting surface which is co-planar with the second surface of the slider and extends from the second surface of the slider.

2. The thin film magnetic head according to claim 1, wherein at least one groove is formed in the second surface of the slider which is opposite to the first surface facing the magnetic recording medium.

3. The thin film magnetic head according to claim 1, wherein at least one groove is formed in the second surface of the slider, in the direction of air flow, which is opposite to the first surface facing the magnetic recording medium.

4. The thin film magnetic head according to claim 1, wherein said first surface of the slider which faces the magnetic recording medium is flat.

* * * * *